Oct. 8, 1935.   A. KIPNIS   2,016,375
METHOD FOR UNITING CONDUITS
Filed June 15, 1931   2 Sheets-Sheet 2
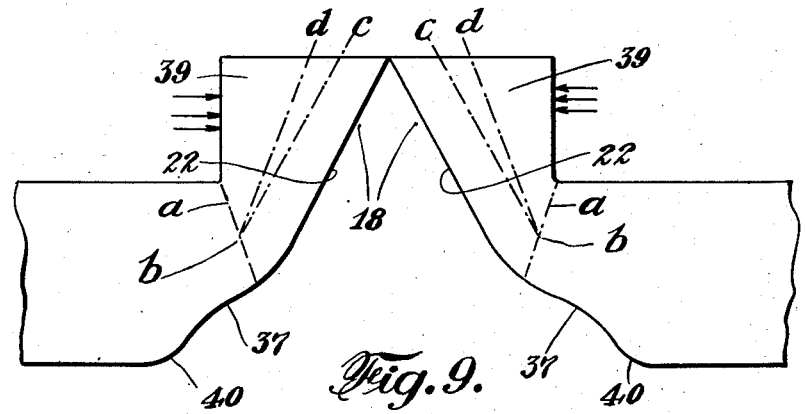
Fig. 9.
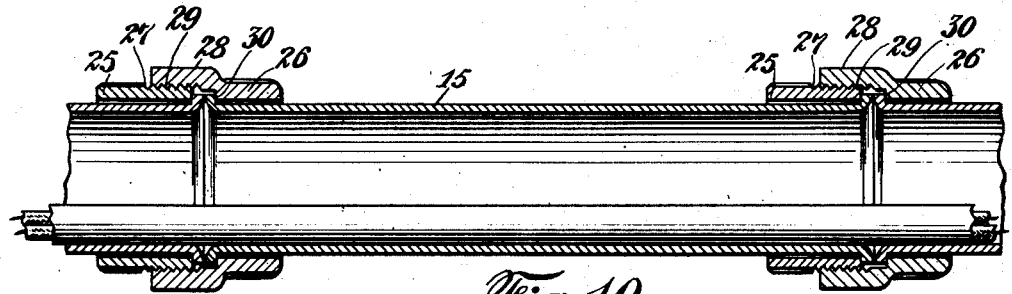
Fig. 10.
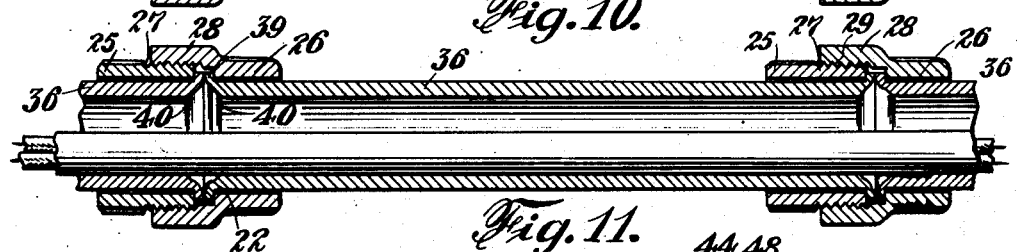
Fig. 11.
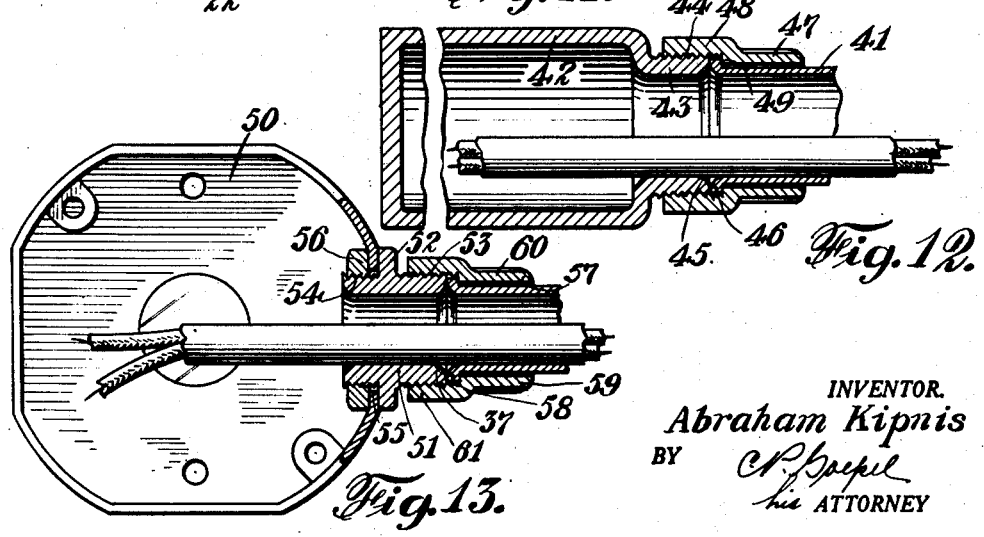
Fig. 12.
Fig. 13.
INVENTOR.
Abraham Kipnis
BY
his ATTORNEY Patented Oct. 8, 1935

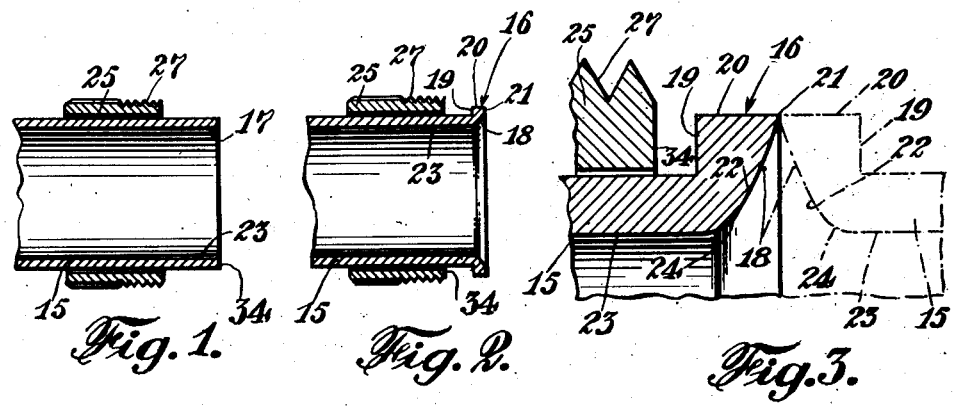
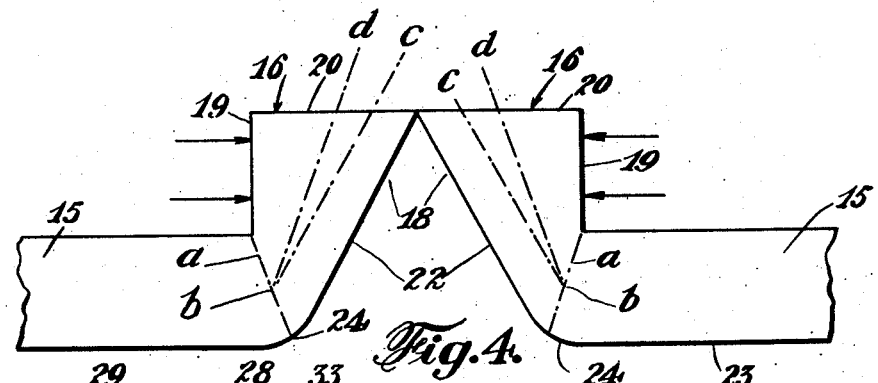
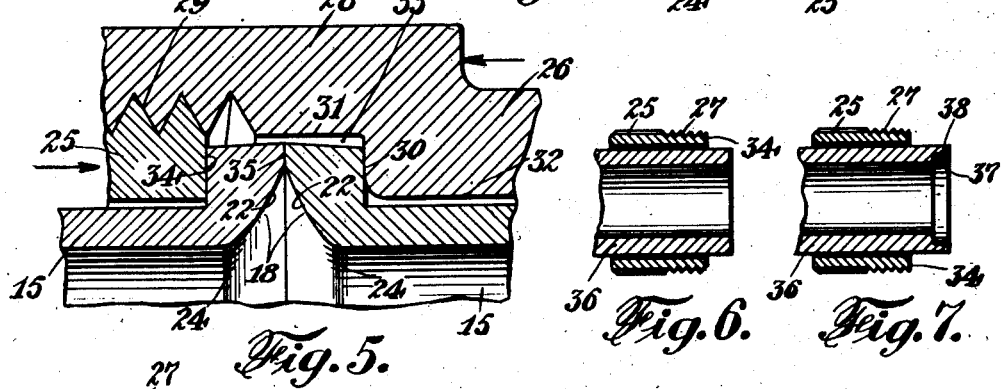
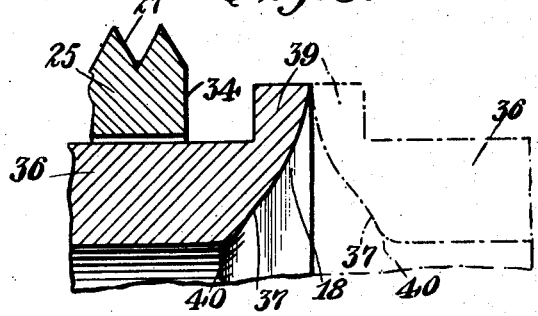

2,016,375

UNITED STATES PATENT OFFICE 2,016,375

METHOD FOR UNITING CONDUITS

Abraham Kipnis, Far Rockaway, N. Y.

Application June 15, 1931, Serial No. 544,451

12 Claims. (Cl. 29—148.2)

This invention relates to conduits or pipes of the kind employed in buildings or erections for the purpose of receiving and protecting electric wiring, the invention being related more particularly to a class of steel conduits for such purpose, and the object of the invention is to provide a novel method for uniting the pipe sections and therewith the condulet parts, all of which together comprise the conduit system for the electric conductors.

Steel pipes, being hard and rigid, possess many advantages over piping produced from softer material and are now in most instances preferred as a means for housing the electric wiring systems; but the steel pipes, manufactured in relatively long lengths, are difficult to operate upon at the building site, difficulties being encountered in fitting them in the desired locations, in coupling them together, in connecting them with condulets and outlets, and especially in "fishing through" and positioning the electric conductors to be protected.

By the method and system of the present invention, all of the foregoing difficulties, and many others which have not been mentioned, are entirely obviated. According to my invention, the steel pipes, at the building site, or on any particular building floor, may be cut into lengths as small as desired and may be operated upon for jointing or uniting in accordance with any devious course which the conduit line is required to follow. Furthermore, by assembling the pipes in short lengths, it is a comparatively easy matter to "fish" the electric conductors through the piping system. Any suitable machine, device, or tools may be used at the building site for cutting the pipes and flanging them for connection in the conduit system; and a machine for such purpose is illustrated and described in my copending application for Flange forming machine, Serial No. 494,835, filed November 11, 1930.

According to my invention butt joints are provided, these joints being made by the meeting of the two flanged ends of adjoining coaxial conduit pipe sections. The flanges for the butt joints are upset outwardly from the ends of the pipes, these flanges flaring or spreading outwardly so as to provide at the adjoining ends of the pipe bodies, inside spaces or excavations in open communication with the hollow interiors of the pipes. The upset flanges are given a special form or shape in order to carry out the objects of the invention, their rear faces being made perpendicular or substantially perpendicular to the tubular bodies, their heads being expanded in the direction of the length of the tubular bodies to provide circumferential faces and front circumferential edges concentric with the axes of adjoining coaxial bodies, and their front faces inclining or curving from the circumferential edges to the inner peripheral surfaces of the bodies in order to provide the inside spaces or excavations. Furthermore, curved portions are provided at the juncture of the front faces with the inner peripheral surfaces of the tubes in order to avoid any corners or jutting parts which might have hooking engagement with the wiring insulation. In joining the conduit pipe sections oppositely directed forces are applied by coupling means to the rear perpendicular faces of the two flanges to be connected. Owing to the provision of the circumferential front edges, the flanges of adjoining tubes can meet only along a single contact point. Upon the application of the oppositely directed forces, the flanges are deformed outwardly until the single meeting point is increased to a meeting line along which the flanges are pressed tightly together and so maintained by the coupling means which supplies the pressure.

With the foregoing and other objects in view, the invention consists in the novel steps and features of operation for the performance of the functions and the accomplishment of the results herein contemplated, and for the purpose of aiding in the description hereinafter given, certain examples of the invention are illustrated in the accompanying drawings, in which:—

Figure 1 is a sectional representation, showing a pipe end portion before the flange is formed thereon, and showing also a coupling part upon the portion;

Fig. 2 is a similar view, showing a flange formed on the end of the pipe;

Fig. 3 is a fragmentary sectional view on a larger scale, showing the flanges of two adjoining pipes meeting at a single contact point;

Fig. 4 is a diagrammatical representation, illustrating the lines along which the applied forces are directed;

Fig. 5 is a fragmentary sectional view, showing the coupling parts threaded together with the flanges maintained together along a meeting line;

Figs. 6, 7, 8 and 9 are views similar to Figs. 1 2, 3 and 4, respectively, but illustrating how the result is achieved where the tubular body or wall is of increased thickness;

Fig. 10 is a fragmentary sectional view of a conduit line showing pipe sections consisting of relatively thin walls, joined end to end in accordance with the invention;

Fig. 11 is a view similar to Fig. 10, but showing pipe sections composed of relatively thick walls, joined in accordance with the invention;

Fig. 12 is a fragmentary sectional view showing a pipe section connected directly to the end of a conduit by my improved method; and Fig. 13 is a similar view showing how, according to my method, a pipe section may be connected to an auxiliary coupling part which is clamped to another type of conduit.

Referring with more particularity to the accompanying drawings, and first to Fig. 1, 15 denotes a steel conduit pipe which may be referred to as a blank form, the same being a plain tube having a plain open end portion. The material of the free or open end portion is upset outwardly to produce an annular flaring flange denoted in general by the numeral 16. This flange may be produced by rolling or swaging pressure exerted from within the tube and against the inner portion thereof. The material is swaged and cuffed outwardly so as to spread or mold the flange both outwardly and forwardly in a flaring manner, to provide inside the flare and concentrically around the hollow interior of the tube a space or excavation 18. The flange is swaged or cuffed outwardly against a suitable anvil or truing tool designed to produce on the flange a rear or back face 19 which is perpendicular or substantially perpendicular to the wall of the tube. A circumferential head 20 is formed whose greatest length is in the direction of the length of the tube and at the circumference thereof in order to produce a front circumferential end edge or reach 21 lying outside the circumferential outline of the body of the tube and well forwardly thereof. The front face 22 of the flange recedes from the circumferential edge or reach 21 to the inner peripheral surface 23 of the tube, thereby leaving the inside space or excavation 18 previously referred to. At the juncture of the front face 22 with the inner peripheral surface 23 of the tube there is produced a smooth, rounded portion 24, the purpose of which is to obviate a corner or any projection capable of interfering with the "fishing through" of the electric wiring or capable of hooking into the insulation thereof. The annular front face 22 between the circumferential edge or reach 21 and the rounded portion 24 may be rounded or substantially straight as desired. The outward upsetting of the flange may be said to take place along a tail line $a$ (Fig. 4) and about a central point as $b$ thereon and outwardly along lines as $b$—$c$ and $b$—$d$, the bending or swaging being accompanied by a compression in front of the tail line $a$ and an expansion outwardly thereof to produce the expanded head having its greatest extent in the direction of the length of the pipe at its circumferential surface in order to produce the circumferential front edge 21 which constitutes for abutment purposes a long range end reach or extremity. It is in place to state here that by means of the machine disclosed in my copending application above referred to, flanges of the type described may be readily produced on steel pipes whose walls have a thickness of one-sixteenth of an inch or thereabouts.

Where a pipe is to be given a place as a section in a conduit line, each end of the pipe is, of course, provided with a flange. However, before the flanges are produced, coupling members 25 and 26 are mounted upon the pipes. These coupling members have loose fit upon the pipes so as to be easily moved either axially or rotatably. Each pipe section is furnished with both of these coupling members, one coupling member being designed for use at one end of the pipe while the other is employed at the opposite end thereof. The coupling member 25 is in the form of a sleeve having an externally screw-threaded portion 27. The member 26 is also in the form of a sleeve provided with an enlarged portion 28 which surrounds the two abutting flanges and is furnished with an interior threaded region 29 for cooperating with the exterior screw threads of the member 26. A shoulder 30 intervenes between the larger interior diameter 31 and the smaller interior diameter 32. The parts are so proportioned and arranged that the large interior diameter 31 provides a space 33 between it and the circumferential faces of the flanges. With this construction, when the coupling member 26 is screw-threaded upon the coupling member 25, while the last-named is held against rotation although permitted to advance axially, the shoulder 30 of the member 26 and the end 34 of the member 25 will abut against the opposite rear faces of the two flanges and so constitute oppositely directed forces for pressing and bending the flanges tightly together; and by forcibly continuing the screw-threading of the member 26 upon the member 25, the two flanges will be deformed outwardly into the space 33, with the result that the circumferential edge contact between the flanges will be increased to a line contact 35, as illustrated in Fig. 5. It will be evident that upon the application of the forces to the opposite faces of the flanges and that upon the outward deformation of the flanges in the space 33, the front faces 22 of the flanges will be pressed together to produce the annular line contact 35.

With the described method and arrangement of an outwardly flaring flange meeting an outwardly flaring flange along a circumferential edge from which the flanges recede to provide an interior space, and with the oppositely directed forces applied to the perpendicular rear faces of the flanges to deform the flanges outwardly, thereby increasing the circumferential edge contact to an extended line contact, a firm and solid connection or union is effected between the pipe ends for the protection of the electric conductors which are housed in the conduit pipes. This method, it will be noted, is extremely simple, and by its use a firm and permanent butt joint is made which occupies but little space.

An important advantage involved in the utilization of my method resides in the fact that the pipe sections may be cut to the desired length and the flanges produced thereon at the building site and even on the floor where the pipes are to be installed in the conduit system. The length of each pipe section is, of course, determined by the conditions encountered in installing the conduit line; each pipe section being cut to the precise length which best enables the pipe fitter to "fish through" the electric conductors at any particular place in the conduit line. For a straight conduit course, it has been found in practice that it is advantageous to cut the pipes in lengths of about ten feet. For devious courses, the pipes may consist of very short lengths, the shortness of the pipes being limited only by the space required for the operative accommodation of the two coupling members 25 and 26.

I have so far described my method as utilized in connection with pipe sections having relatively thin walls. In Figs. 6 to 9, inclusive, I illustrate how my method may be carried out in connection with pipes having relatively thick walls, say, for instance, a thickness of one-eighth of an inch or thereabouts. In this instance, the ends of the relatively thick pipe walls 36 are first provided with inner annular recesses or cut-out portions 37 by a preliminary removal of the material, leaving outer reduced projecting portions 38 (Figs. 7 and 9) which are rolled or swaged by the metal flowing under pressure and a controlled movement outwardly to form flaring flanges 39 substantially like the flanges 16 hereinbefore described. These heavy walled conduit pipes are fitted with coupling members 25 and 26 in the same manner as described in connection with the thin walled pipes. The mode of forcibly binding or pressing the flanges 39 by means of the coupling members so as to increase the circumferential edge contact to a line contact may be used but is not necessary, and then does not differ in principle from that hereinbefore described in connection with the thin walled pipes. In the thin walled pipes, there is also a rolling or swaging or metal flow under pressure and a controlled movement thereof. The corners 40 at the inner ends of the recesses 37 are rounded in order to obviate the existence of any metal parts which may interfere with the insertion of the electric conductors or which may catch in the insulation thereof. In Figs. 10 and 11, I show fragmentary conduit lines composed, respectively, of pipes having relatively thin walls and relatively thick walls.

In the illustrative embodiment of Fig. 12, I show a pipe conduit 41 connected directly with a condulet 42. In this instance, the condulet is provided with a reduced terminal portion 43 which is exteriorly threaded at 44 and the extremity of the terminal portion is rounded at 45 to provide the inside space. The flange 46 of the conduit pipe abuts against the extremity of the terminal 43 and is forcibly pressed thereagainst by a coupling member 47 having an enlarged portion 48 which is screw-threaded upon the screw threads of the terminal 43. The member 47 has a shoulder 49 which, during the screw-threading process, applies force against the rear face of the flange 46 to effect the tight union.

In Fig. 13, I illustrate another form of conduit 50 in one end of which is provided a tubular fitting 51 having an exterior flange 52 separating exterior screw-threaded regions 53 and 54. This tubular fitting is entered into an opening 55 in the end of the condulet with the flange 52 overlapping the wall of the condulet; and a securing nut 56 which is applied to the threaded portion 54 overlaps the inner face of the condulet wall. By this simple arrangement the tubular fitting 51 is secured to the condulet, the wall of which surrounding the opening 55 is clamped between the flange 52 and nut 56. The outer end of the fitting is rounded at 57 to provide the interior space and circumferential edge. The flange 58 of the conduit 59 abuts against the outer end of the fitting and the union is effected by the application of a coupling member 60, the enlarged portion 61 of which is screw-threaded directly upon the tubular fitting. A tight butt joint is effected between the conduit pipe and the tubular fitting in substantially the same manner as hereinbefore described. The arrangements illustrated in Figs. 12 and 13 greatly facilitate the extension of the electric conductors into the condulets, inasmuch as the joints are butt joints with no corners or projections which will hook into the insulation of the wiring.

While I have described my invention as comprising a certain mode of treatment and have illustrated it with the aid of certain selected forms for carrying it into effect, it will be understood that the invention may be variously embodied. It has been sought herein to illustrate only such embodiments as will suffice to exhibit the character of the invention. Reservation is, therefore, made to the right and privilege of changing the form of details set forth or otherwise altering the arrangement of the parts without departing from the spirit or scope of the invention or the scope of the appended claims.

I claim:—

1. The method of forming a union between two tube ends of hard stock which comprises cuffing the tube ends into forwardly and outwardly flaring edges and positioning the ends to bring the flaring edges in abutment with each other at their outermost reaches, and then forcibly pressing the ends endwise together sufficiently to flatten the outermost reaches of the edges and thereby substantially increase the line of abutment therebetween to an effective depth, and concurrently securing the maintenance of the pressure by which the flattened ends are pressed endwise together.

2. In the method of connecting together the ends of two conduits for receiving and protecting electric wiring, the steps which consist in forming at adjacent ends forwardly and outwardly flaring flanges adapted to contact at outer reaches outside the circles of the peripheries of the conduits forcing the flanges toward each other to flatten the contacting reaches, and then securing the ends to each other with the flattened reaches pressed with steady force against each other.

3. In a method of forming a union between conduits comprising tubular stock, the steps which consist in shaping the end portions of the stock into forwardly and outwardly flaring flanges, forming backs on the flanges to receive applied forces, forming receding walls on the front faces of the flanges inwardly of the outer reaches thereof, assembling the stock with the outer reaches in abutment and the receding walls diverging from such reaches in opposing relation, applying forces to the backs to press the abutting reaches together with sufficient power to flatten the same around the receding walls, and in securing the flanges with the flattened reach of one flange pressed with steady force against the flattened reach of the other flange.

4. In a method of forming a union between conduits having two ends of tubular stock, the steps which consist in shaping one end into an outwardly and forwardly flaring flange, forming a back on the flange, forming a circumferential front reach on the flange and a receding wall inwardly thereof, assembling the stock with the circumferential reach abutting against the other of the ends and with the receding wall opposite thereto, moving the stock parts endwise one to the other by pressure constraining between the back and the other of the ends, sufficiently to flatten the circumferential reach and bring a portion of the receding wall into abutment with the other of the ends and in a continuous line with the flattened reach, and concurrently securing the maintenance of such constraining pressure.

5. The method of forming a union between two tube ends of hard relatively thick stock which consists in recessing the ends to produce reduced outer portions, cuffing the outer portions into outwardly and forwardly flaring flanges, positioning the ends to bring the outer reaches of the flanges in abutment with each other, forcing the ends endwise together sufficiently to flatten the abutting outer reaches and thereby substantially increase the line of abutment therebetween to an effective depth, and concurrently securing the maintenance of the pressure by which the flattened reaches are pressed endwise together.

6. The method of forming a union between two tube ends of hard stock which consists in cuffing the tube ends into outwardly and forwardly flaring flanges shaped to have front outward curves at the junctions of their tails with the tubes and to have front circumferential reaches at their heads, placing the ends with the reaches in abutment with each other, forcibly pressing the ends endwise together sufficiently to flatten the abutting reaches and thereby substantially increase the line of abutment to an effective depth, and concurrently securing the ends together for maintaining the pressure by which the flattened reaches are pressed together.

7. In the method of connecting the end of an abutment element with the end of a tube, the steps which consist in shaping the end portion of the tube into an outwardly and forwardly flaring flange having an outer circumferential reach, positioning the tube with the reach thereof abutting the end of the abutment element, forcibly pressing the two ends endwise together sufficiently to flatten the reach and thereby substantially increase the line of abutment with the abutment element to an effective depth, and concurrently securing the two ends together for maintaining the pressure by which the flattened reach is pressed against the abutment element.

8. The method of forming butt ends in a pipe, which consists in subjecting the end of a tubular pipe to rolling, swaging or metal flowing under control, to form a flaring portion, and then flattening the flaring portions adjacent the tip thereof to form a butt end as far as possible from the body of the pipe.

9. The method of forming butt ends in a pipe, which consists in first removing a part of the material of the end of the pipe, and then subjecting the remaining portion to a rolling or swaging or metal flowing operation, to transform the remaining metal at the end of the pipe to a flaring portion, and then flattening the flaring portion adjacent the tip thereof to form a butt end as far as possible from the body of the pipe.

10. A method of forming a butt end on a hard-walled pipe comprising simultaneously swaging and bending the end portion of the pipe body in such manner as to stretch or expand the metal into a flaring rim flaring forwardly and outwardly of the pipe body, and then subjecting the rim to transverse compression to flatten the flaring face inwardly from its periphery toward the longitudinal axis of the pipe body and while maintaining the flaring face against an abutment with which the flattened end is to conform.

11. A method of forming a butt end on a hard-walled pipe comprising simultaneously swaging and bending the end portion of the pipe body in such manner as to stretch or expand the metal into a flaring rim which flares forwardly and outwardly of the pipe body, then subjecting the outer reach of the rim to compression forces exerted toward one another against the front and rear of the rim and wholly outside the circle of the periphery of the pipe body to flatten the flaring front face inwardly from its periphery toward the longitudinal axis of the pipe body, thus producing for the finished butt end a flattened portion removed as far as possible from the pipe body and providing for flexing of the flaring rim when the flattened portion is forced against a surface with sufficient pressure.

12. The method of forming a butt end on a pipe which consists in subjecting the end of a tubular hard-walled metal pipe to rolling, swaging or metal forming under control to form a cylindrical portion flaring forwardly and outwardly from the inner periphery of the pipe, with the front face of said portion having its inception on a curve around the tubular bore and curving forwardly and outwardly and thence shaped along a forward and outward inclination to an outer end edge abutment, the rear face of said portion being flat and lying in a plane at right angles to the outer peripheral surface of the pipe and the body of said portion increasing in thickness between the front and rear faces from its junction with the pipe to its outer cylindrical surface, said front flaring cylindrical portion forming a flange projecting at the open end of the pipe adapted to be engaged by a sleeve coupling extending from the rear face of the flange forwardly across and beyond the edge abutment to engage an adjacent like flanged end of an adjacent pipe and when the coupling is tightened providing for bringing the end abutments uniformly throughout the circumference thereof together along an abutment line lying in a plane parallel with the plane of the rear face and adapted as pressure increases to be increased inwardly and substantially in extent by the bringing together of a portion of the inclined face lines of the two flanges converging toward and to the abutment line from the curves around the tubular bores of the two pipes.

ABRAHAM KIPNIS.